(12) United States Patent
Epelbaum

(10) Patent No.: US 10,916,147 B2
(45) Date of Patent: Feb. 9, 2021

(54) METHODS AND SYSTEMS FOR DETECTING TURBULENCE

(71) Applicant: Panasonic Avionics Corporation, Lake Forest, CA (US)

(72) Inventor: Mark Epelbaum, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 22 days.

(21) Appl. No.: 16/198,333

(22) Filed: Nov. 21, 2018

(65) Prior Publication Data

US 2020/0160729 A1     May 21, 2020

(51) Int. Cl.
*G08G 5/00* (2006.01)
*G01C 23/00* (2006.01)
(Continued)

(52) U.S. Cl.
CPC ....... *G08G 5/0039* (2013.01); *B64D 11/0015* (2013.01); *B64D 43/02* (2013.01); *G01C 23/00* (2013.01); *G08G 5/0013* (2013.01); *G08G 5/0021* (2013.01); *G08G 5/0043* (2013.01); *G08G 5/0047* (2013.01)

(58) Field of Classification Search
CPC .. G08G 5/0039; G08G 5/0013; G08G 5/0021; G08G 5/0043; G08G 5/0047; G08G 5/0091; B64D 11/0015; B64D 43/02; G01C 23/00; G01C 21/20; G01W 1/10;
(Continued)

(56) References Cited

U.S. PATENT DOCUMENTS

| 5,541,591 A | 7/1996 | Bush |
| 6,430,996 B1 | 8/2002 | Anderson et al. |

(Continued)

OTHER PUBLICATIONS

Bellamy III, Woodrow, Gol Becomes Gogo's Connected Aircraft Service Launch Partner, www.aviationtoday.com, Oct. 29, 2018, 6 pgs., https://www.aviationtoday.com/2018/10/29/gol-becomes-gogo-aircraft-data-service-launch-partner/.

(Continued)

*Primary Examiner* — Anne Marie Antonucci
*Assistant Examiner* — Andrew J Cromer
(74) *Attorney, Agent, or Firm* — Klein, O'Neill & Singh, LLP

(57) ABSTRACT

Methods and systems for detecting turbulence are provided. One method includes collecting data by a plurality of sensors of an antenna system of an in-flight entertainment (IFE) system of an aircraft, the plurality of sensors collecting aircraft rotation data, aircraft acceleration data, data indicating change in magnetic flux, and data indicating atmospheric pressure and temperature; detecting a change in position of the aircraft by a computing device of the IFE system based on the collected data; identifying turbulence by the computing device based on the detected change in position matching a signature indicative of turbulence; transmitting at least one data packet with a turbulence profile by the computing device to a ground based computing system, the turbulence profile including data from the plurality of sensors used for identifying turbulence; and using the turbulence profile by the ground-based computing system for modifying a route of another aircraft.

20 Claims, 6 Drawing Sheets

(51) Int. Cl.
*B64D 11/00* (2006.01)
*B64D 43/02* (2006.01)

(58) Field of Classification Search
CPC . G01W 2001/003; G05D 1/046; B64C 13/16;
G01R 29/14; G01R 33/02
See application file for complete search history.

(56) References Cited

U.S. PATENT DOCUMENTS

| | | | |
|---|---|---|---|
| 2002/0075171 A1* | 6/2002 | Kuntman | G08G 5/0091 |
| | | | 340/961 |
| 2005/0073302 A1* | 4/2005 | Hibbs | A61B 5/04 |
| | | | 324/247 |
| 2006/0155432 A1* | 7/2006 | Brown | G01C 21/20 |
| | | | 701/14 |
| 2008/0255714 A1 | 10/2008 | Ross | |
| 2009/0157239 A1* | 6/2009 | Walton | B64C 13/16 |
| | | | 701/6 |
| 2016/0133137 A1 | 5/2016 | Rencher et al. | |

OTHER PUBLICATIONS

"Tactical Grade, Ten Degrees of Freedom Inertial Sensor", p. 1-36, Analog Devices, Inc.

* cited by examiner

METHODS AND SYSTEMS FOR DETECTING TURBULENCE

TECHNICAL FIELD

The present disclosure relates to detecting turbulence for an aircraft.

BACKGROUND

Many commercial airplanes today have individualized video and audio entertainment systems, often referred to as "inflight entertainment" or "IFE" systems. Such systems may also be referred to as "inflight entertainment and communication" systems as well, and typically abbreviated as "IFEC" systems. The IFEC systems typically use an antenna system to interface with a satellite for sending and receiving content. In conventional systems, the antenna system uses various sensors to collect aircraft position data for keeping the antenna directed towards a selected satellite. Continuous efforts are being made to better use antenna system sensor data.

SUMMARY

Methods and systems for detecting turbulence are provided. One method includes collecting data by a plurality of sensors of an antenna system of an in-flight entertainment and communication (IFEC) system of an aircraft, the plurality of sensors collecting aircraft rotation data, aircraft acceleration data, data indicating change in magnetic flux, and data indicating atmospheric pressure; detecting a change in position of the aircraft by a computing device of the IFE system based on the collected data; identifying turbulence by the computing device based on the detected change in position reaching a threshold value and more preferably matching or falling within a signature/profile associated with turbulence; transmitting a data packet with a turbulence profile by the computing device to a ground based computing system, the turbulence profile including data from the plurality of sensors used for identifying turbulence; and using the turbulence profile by the ground-based computing system for modifying a route of another aircraft.

In another aspect, a method includes using an antenna system of an in-flight entertainment and communication (IFEC) system of an aircraft for collecting aircraft rotation data, aircraft acceleration data, data indicating change in magnetic flux, and data indicating atmospheric pressure; comparing data retrieved from the antenna system to a threshold value by a computing device of the aircraft to detect turbulence; transmitting a turbulence signature by the computing device to a ground based computing system, the turbulence signature including data used for identifying turbulence; determining a parameter by the ground based computing system for predicting turbulence, based on the turbulence signature; and generating a flight plan by the ground based computing system, based on predicted turbulence.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1:
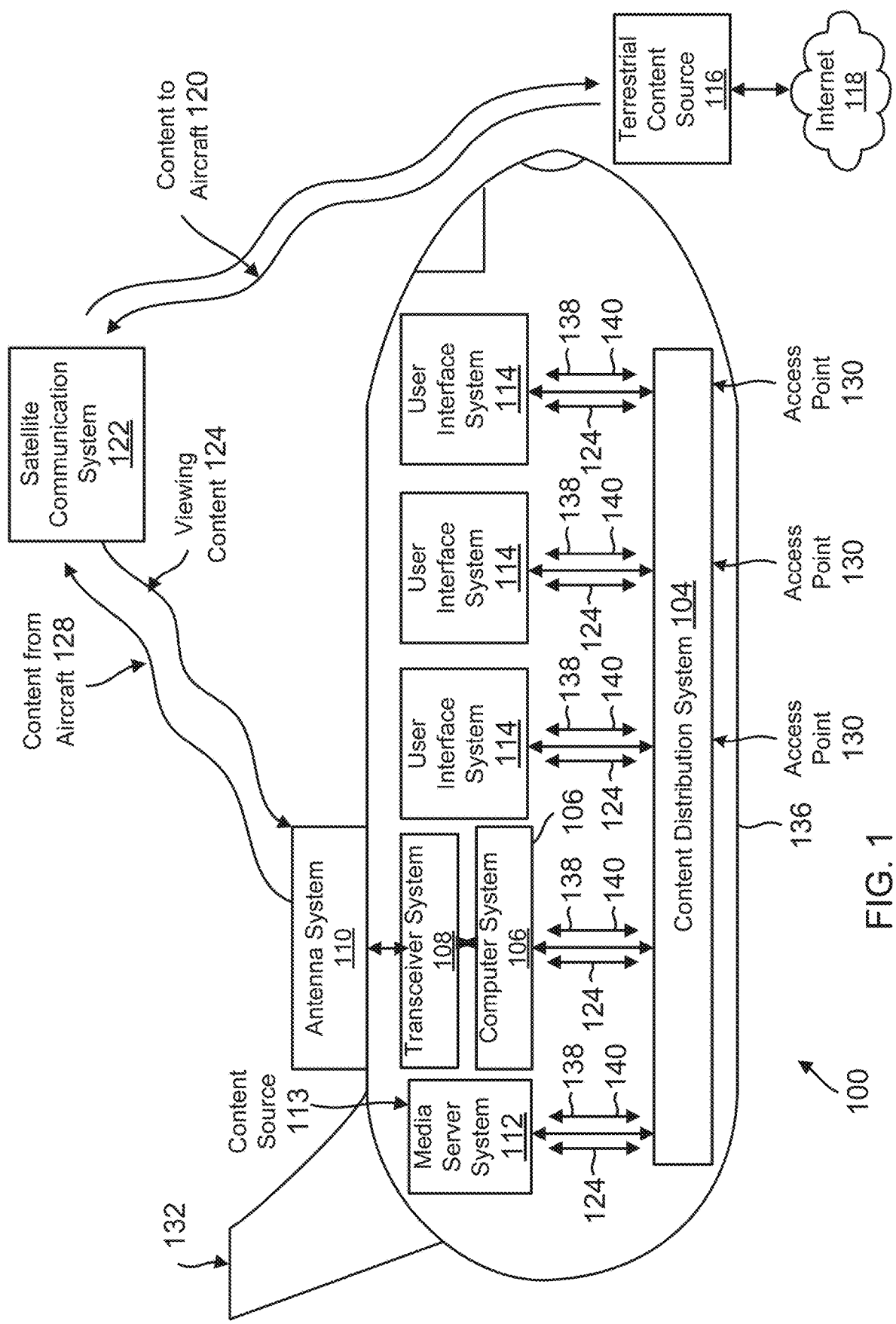
FIG. 1 shows an example of an operating environment for implementing the various aspects of the present disclosure on an aircraft.

Vehicle Information System:

FIG. 1 shows an example of a generic vehicle information system 100 (also referred to as system 100) that can be configured for installation aboard an aircraft 132 for using the innovative technology described herein, according to one aspect of the present disclosure. When installed on an aircraft, system 100 with an antenna system 110 can comprise an aircraft passenger IFE system, such as the Series 2000, 3000, eFX, eX2, eX3, eXW, NEXT, and/or any other inflight entertainment system developed and provided by Panasonic Avionics Corporation (without derogation of any trademark rights of Panasonic Avionics Corporation) of Lake Forest, Calif., the assignee of this application.

System 100 comprises at least one content source 113 and in some configurations, one or more user (or passenger) interface systems (may also be referred to as a seat device/seatback device) 114 that communicate with a real-time content distribution system 104. In other configurations, seat devices may not be included and communication is with passenger personal electronic devices (PEDs). The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100 and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100 can communicate with the content sources 113 in real time and in any conventional manner, including via wired and/or wireless communications. System 100 and the terrestrial content source 116, for example, can communicate directly and/or indirectly via an intermediate communication system, such as a satellite communication system 122. System 100 thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100 may also include the antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100. The computer system 106 can provide the received content 120 to the media (or content) server system 112 and/or directly to one or more of the user interfaces 114 as viewing content 124. Although shown and described as being separate systems for purposes of illustration, the computer system 106 and the media server system 112 can be at least partially integrated.

In one aspect, the antenna system 110 uses a plurality of sensors for collecting data to track an aircraft's position, at any given time. The collected data is used by computer system 106 to identify aircraft turbulence as described below in more detail.

The user interface system 114 may be PEDs in communication with an access point 130. The user interface system 114, which may be seat devices and/or PEDs provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs to receive and view content via an access point 130. While bandwidth limitation issues may occur in a wired system on a vehicle, such as an aircraft 132, in general the wired portion of the vehicle information 100 system is designed with sufficient bandwidth to support all users aboard the vehicle, i.e., passengers.

The user interface system 114 may also include an input system (not shown) for permitting the user (or passenger) to communicate with system 100, such as via an exchange of control signals 138. For example, the input system can permit the user to enter one or more user instructions 140 for controlling the operation of system 100. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 2:
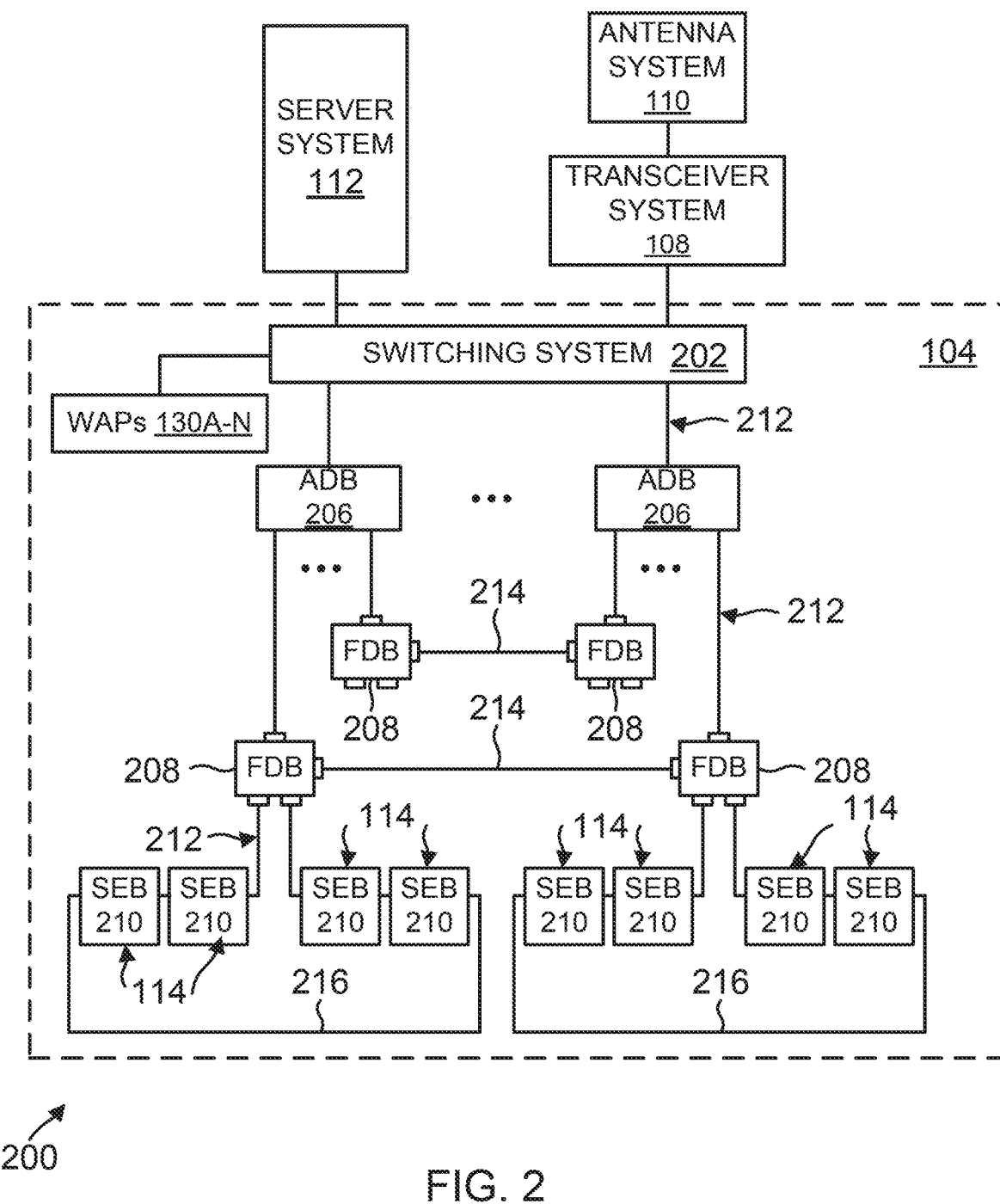
FIG. 2 shows an example of a content distribution system on an aircraft, used according to one aspect of the present disclosure.

Content Distribution System:

FIG. 2 illustrates an example of the content distribution system 104 for the vehicle information system 200 (similar to system 100), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANS), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
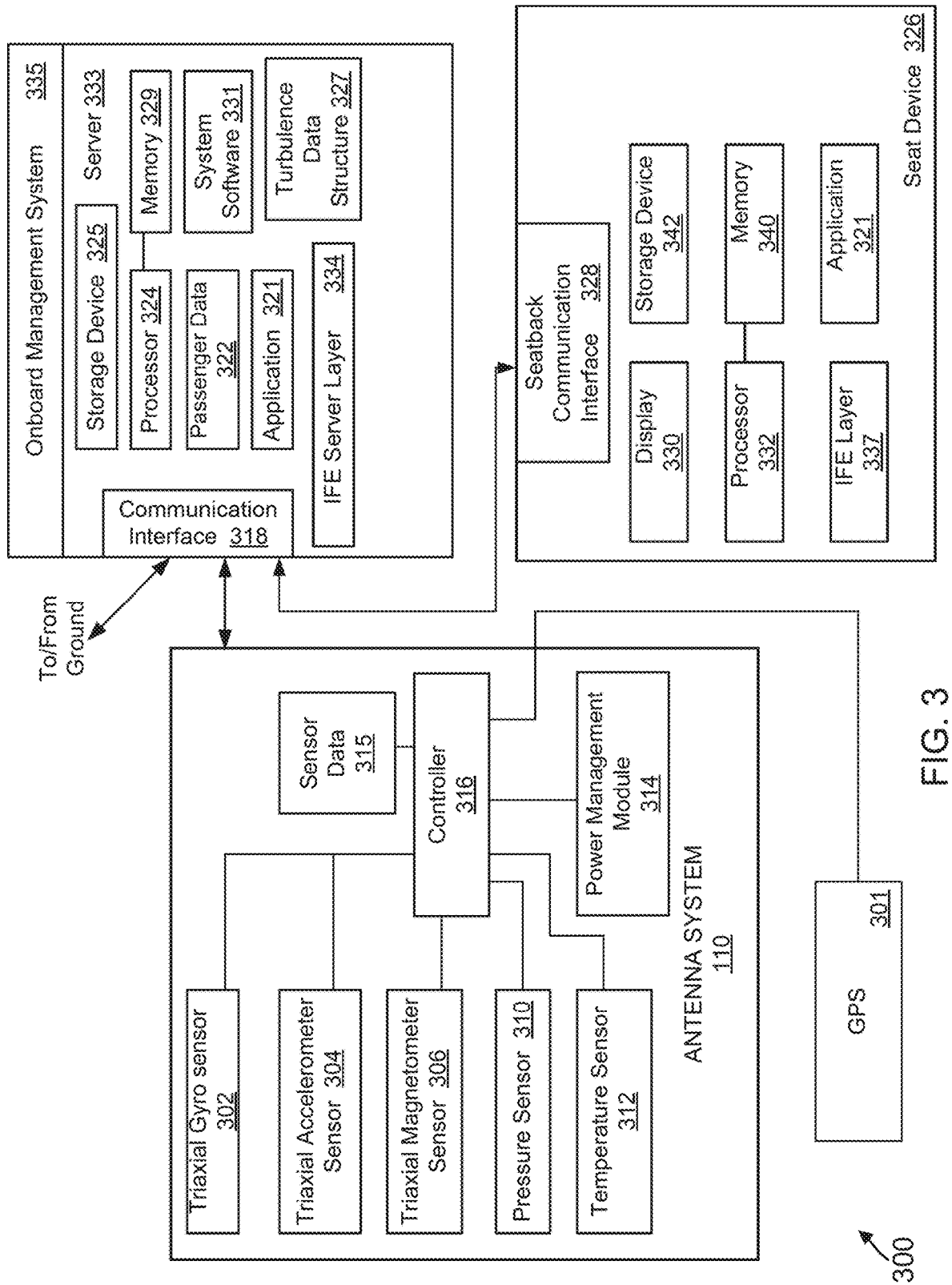
FIG. 3 shows an example of an antenna system interfacing with an IFE system, according to one aspect of the present disclosure.

System 300:

FIG. 3 shows an example of a system 300 using the innovative computing technology, according to one aspect of the present disclosure. System 300 includes the antenna system 110, an onboard management system 335, and a seat device 326 (may also be referred to as seatback device or a smart monitor). The onboard management system 335 may be similar to computer system 106 and/or server 112 described above with respect to FIG. 1. The seat device 326 may be part of the user interface system 114 or interfaces with the user interface system 114 described above with respect to FIG. 1. It is noteworthy that the seat device 326 need not be mounted on the back of a seat and may be supported from other structures, such as a bulkhead, wall, arm of a seat, etc. The adaptive aspects of the present disclosure are not limited to any specific type, location or orientation of the seat device 326.

In one aspect, the antenna system 110 is configured to communicate with a satellite. As an example, the antenna system 110 may be configured for placement at the tail of an aircraft or on the fuselage. Some configurations may include multiple antennas. The various aspects disclosed herein are not limited to any specific area of placement for the antenna system 110.

The antenna system 110 maybe sized and shaped to fit within the space specified by the "ARINC 791" standard that defines the Ku and Ka band satellite data airborne terminal equipment, at least for a wide-body aircraft. For communication with geostationary satellites in the Ku and/or Ka band and providing a satisfactory communication experience for passengers on wide-body aircraft and smaller, a certain G/T is provided by the antenna system 110, for example, around 9 db/K or more. G/T is a factor typically used for characterizing antenna performance, where G the antenna gain in decibels in a receive frequency band, and T is the equivalent noise temperature in Kelvins. For example, the antenna system 110 may be configured to provide a G/T that may be 10 db/K-10.5 db/K for circular polarizations at lower elevations scans, e.g., from 10 up to 30 degrees. For higher elevations scans, e.g., from at least 30 degrees to 90 degrees, G/T may be between 11 db/K to 12.5 db/K. The G/T values are simply provided as examples and are not to be construed as limiting the various adaptive aspects described herein.

In one aspect, antenna system 110 includes a controller 316 that executes instructions for managing various components of antenna system 110. The controller 316 may be implemented as one or more integrated circuits with various components for positioning and pointing of the antenna toward a signal source. Other components manage both receive and transmit signals for the antenna system 110.

In one aspect, the antenna system 110 includes an array of antenna elements (not shown) that are disposed on an antenna tile of a plurality of antenna tiles (not shown). The antenna elements are configured to operate as an array. The antenna tiles maybe substantially the same size for reduced manufacturing and replacement costs, i.e., each tile may have substantially the same dimensions. For an antenna system intended for a wide-body aircraft, and using square tiles, a tile size may range from 50 mm×50 mm to 200 mm×200 m, for example, 100 mm×100 mm. The thickness of each tile may not be more than 30 mm in thickness, for example, between 15 mm to 20 mm in thickness. Thinner tiles maybe used for lighter weight and lower profiles of the antenna assembly for reduced drag. The adaptive aspects disclosed herein are not limited to any particular tile size.

In one aspect, the antenna elements may have interleaved transmit (Tx) and receive (Rx) antenna elements. Each antenna element operates as a radiating element cell, i.e., the smallest building block or component of an antenna array. The antenna elements may be dual edge-fed, pin-fed, EM-coupled or other patch type configured to operate as an array as is known in the art.

In one aspect, the antenna elements are substantially identical to one another in shape and maybe a rectangle, a square, a polygon, a parallelogram, a square or a hexagon. Other shapes may be used as well, such as circles, triangles, rectangles, etc. In general, shapes are preferred that can be place together without overlapping or leaving gaps between the elements.

Suitable antennas are commercially available. For example, Panasonic Avionics Corporation of Lake Forest, Calif., manufactures and markets a single panel antenna for IFEC systems.

In one aspect, the antenna system 110 includes a tri-axial gyroscope sensor 302 (also referred to as gyroscope 302), a tri-axial accelerometer sensor 304 (also referred to as accelerometer 304), a tri-axial magnetometer sensor 306 (also referred to as magnetometer 306), a pressure sensor 310, a temperature sensor 312 and a power management module 314 that manages power for the antenna system 110.

The gyroscope 302 measures rotational motion by measuring angular velocity. The accelerometer 304 measures aircraft acceleration, while the magnetometer 306 measures magnetic flux density. The pressure sensor 310 measures altitude as a function of atmospheric pressure and the temperature sensor 312 measures ambient temperature outside the aircraft. The various sensors periodically collect data that is stored by the antenna system as sensor data 315. The sensor data 315 may be stored at one or more register locations (not shown) of the antenna system 110 and provided to the onboard management system 335. In one aspect, antenna system 110 includes ADIS16488A, inertial sensor provided by Analog Devices Inc. that includes the gyroscope 302, the accelerometer 304, the magnetometer 306, the pressure sensor 310, the temperature sensor 312 and the controller 316.

In conventional systems, data from the gyroscope 302, the accelerometer 304 and the magnetometer 306 are used to maintain an antenna's orientation with respect to a satellite as the vehicle and satellite move relative to one another. By keeping the antenna directed towards the satellite, a data communication link with the satellite is maintained while the vehicle is inflight.

In the various aspects described below, data collected by the gyroscope 302, the accelerometer 304, the magnetometer 306, and the pressure sensor 310 is used to determine aircraft turbulence, for example, by an IFE server layer 334 of the onboard management system 335, as described below in more detail. In another aspect, turbulence may be detected by application 321 and/or system software 331. In yet another aspect, the turbulence may be detected by the IFE layer 337 executed by the seat device 326. Details for detecting turbulence are provided below with respect to FIGS. 4A/4B.

In one aspect, the onboard management system 335 includes a server 333 (similar to media server 112 and/or computer system 106) with a processor 324 having access to a memory 329 via a bus system. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 324 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 324 has access to a storage device 325 that may be used to store data, applications, structured or unstructured data and program files including application 321, system software 331, and/or the IFE layer 334. System software 331 of the onboard management system 335 is executed by the processor 324 to control the overall operation of the server 333 and detect turbulence using a turbulence data structure 327. Application 321 may be used for managing pairing of PEDs as well as determining turbulence.

In one aspect, server 333 communicates with the antenna system 110, and the seat device 326 system via a communication interface 318. The communication interface 318 may also be used to receive information from the ground. The communication interface 318 includes one or more interfaces for a wired and/or wireless connection, as described above with respect to FIGS. 1 and 2.

In one aspect, the onboard management system 335 maintains passenger data 322 that identifies each passenger for a flight, a seat assigned to a passenger and any other information that can uniquely identify the passenger. The passenger data 322 may be populated from an electronic boarding pass that is used by a passenger and/or from the carrier operating the aircraft. The information from passenger data 322 may be provided to seat device 326 for validating passenger information.

In one aspect, the seat device 326 includes a display device or simply "display" 330, a processor 332, a memory 340, a communication interface 328 and a local storage device 342 for storing content. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 336 executes an IFE layer (may also be referred to as IFE controller) 334 that provides inflight entertainment and other options to users. The IFE layer 334 uses the communication interface 328 to interface with the onboard management system 335 and other devices, e.g. personal electronic devices (PEDs). The IFE layer 334 provides audio/video content as well as controls for accessing the content. In one aspect, the IFE layer 334 may also be used to detect turbulence, as described below in detail.

Figure 4A:
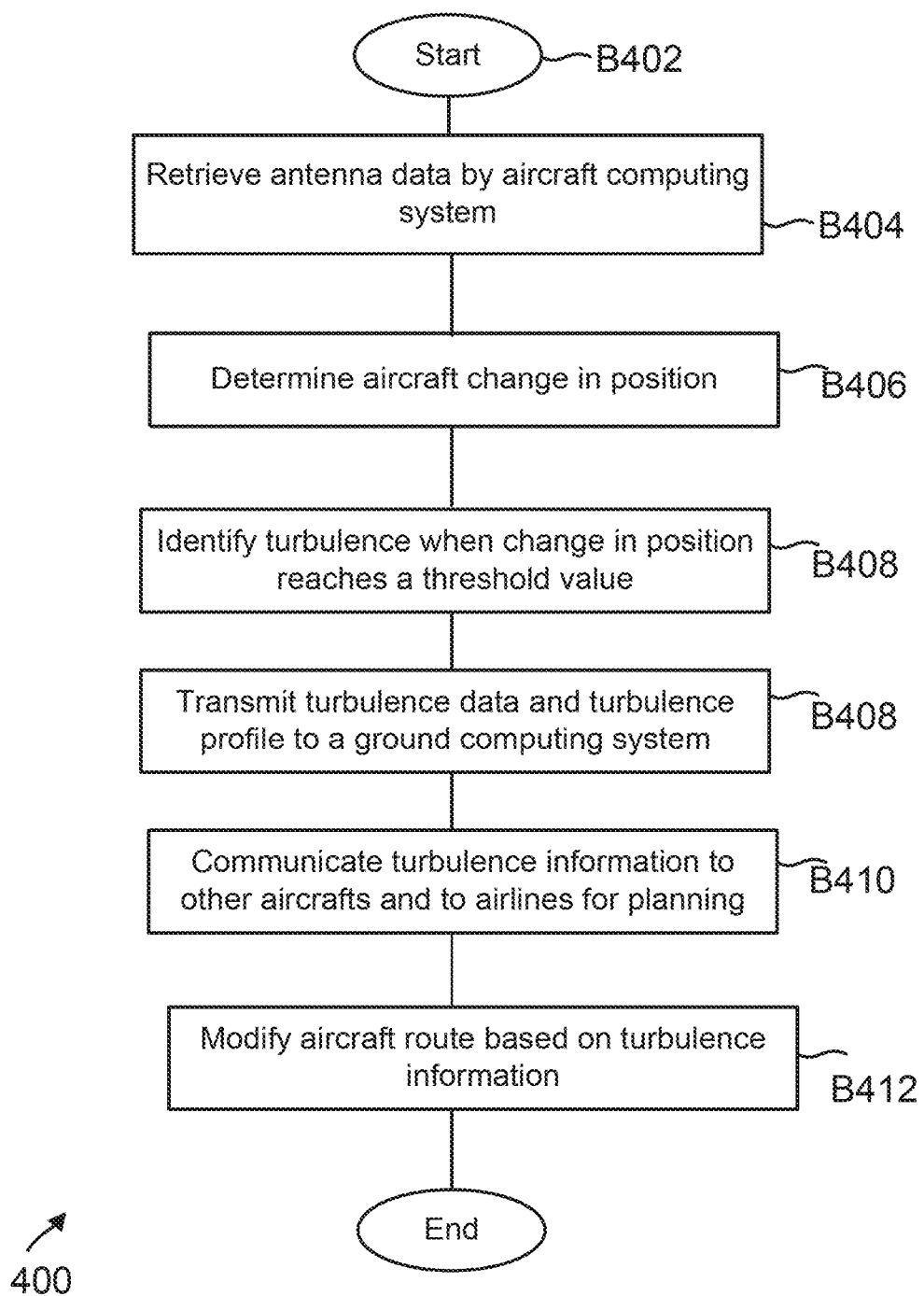
FIG. 4A shows a process flow for using an antenna system for detecting turbulence, according to one aspect of the present disclosure.

Process Flows:

FIG. 4A shows a process 400 for detecting and managing aircraft turbulence, according to one aspect of the present disclosure. Process 400 begins when an aircraft is in flight with the installed antenna system 110, described above in detail. The antenna system 110 collects data from various sensors 302/304/306/310 and 312. In block B404, the sensor data 315 is retrieved in real time by an aircraft computing system, for example, processor 324 of server 333. It is noteworthy that although the process blocks of FIG. 4A are described with respect to server 333, the process blocks may be executed by another computing system or device, for example, seat device 326.

In block B406, server 333 determines a change in aircraft position based on sensor data 315. In one aspect, the rotational data, acceleration, magnetic flux, and pressure are used to define the change in aircraft position. The processor 324 defines aircraft position based on a set of parameters, e.g. [P1-Pn], where P1 may be based on gyroscope 302 data, P2 may be based on accelerometer 304 data, P3 may be based on magnetometer 306 data, P4 may be based on pressure sensor 310 data, along with rates of change of the foregoing parameters (deltas). GPS data 301 is also part of the data set. The temperature data may also be used because temperatures changes as a function of altitude and temperature gradients indicate changes in air density. Additionally, temperature inversions frequently occur at the tops of mountain ranges.

A filtering algorithm, for example a Kalman filter or other known type, may be used to clean up and combine data inputs. These types of algorithms use a series of measurements observed over time containing statistical noise and other inaccuracies, and produce estimates of unknown variables that tending to be more accurate than those based on a single measurement by estimating a joint probability distribution over the variables for each timeframe.

The aircraft may include other data sensors, for example sensors for collecting weather data, as described in U.S. Pat. No. 6,430,996 to Anderson et al., issued Aug. 13, 2002, the content of which is incorporated herein by reference. If the aircraft does include other sensors, additional information from these sensors and other aircraft sensors may be transmitted in conjunction with data from the antenna sensor for collection, analysis, storage and confirmation of antenna sensor data.

In block B408, server 333 detects turbulence when the change in aircraft position reaches or exceeds a threshold value. The threshold value may be pre-programmed and stored at memory 329. The threshold value may vary based on aircraft type, altitude or any other airline defined parameter. In one aspect, the threshold delta in value is defined for each parameter, P1-Pn, described above.

More preferably though, the server 333 detects based on multiple data parameters matching or falling within a predefined signature or profile associated with turbulence. Based on the closeness of the match to the profile, confidence levels may be assigned to whether the aircraft is passing through a turbulent region. The signature/profile may developed using machine learning, for example an artificial neural network into which the data is input. The neural network applies weights to the data parameters to determine when the input data matches a condition indicating turbulence. The weightings are refined over time via training of the neural network on ground computing devices.

In block B410, when turbulence is detected, a turbulence signature (or profile) is generated for the aircraft. The turbulence signature identifies the aircraft, altitude, pressure, geographical location, the various parameter values and the threshold values used to determine turbulence. In one aspect, the turbulence signature is stored as part of a data structure, e.g. 327. The turbulence signature is transmitted by the server 333 to a ground computing system.

In block B410, the ground computing system transmits the turbulence signature to other aircraft that are in the same geographical area or will be passing through this area in the near feature based on flight path or flight plan. The turbulence signature is also provided to one or more airlines for flight planning.

In block B412, one or more aircraft routes are modified based on the turbulence signature. For example, if there is a signature match indicating turbulence, a notification is sent to electronic flight bags (EFBs) to inform pilots, who may then modify the aircraft route to avoid turbulent regions.

Figure 4B:
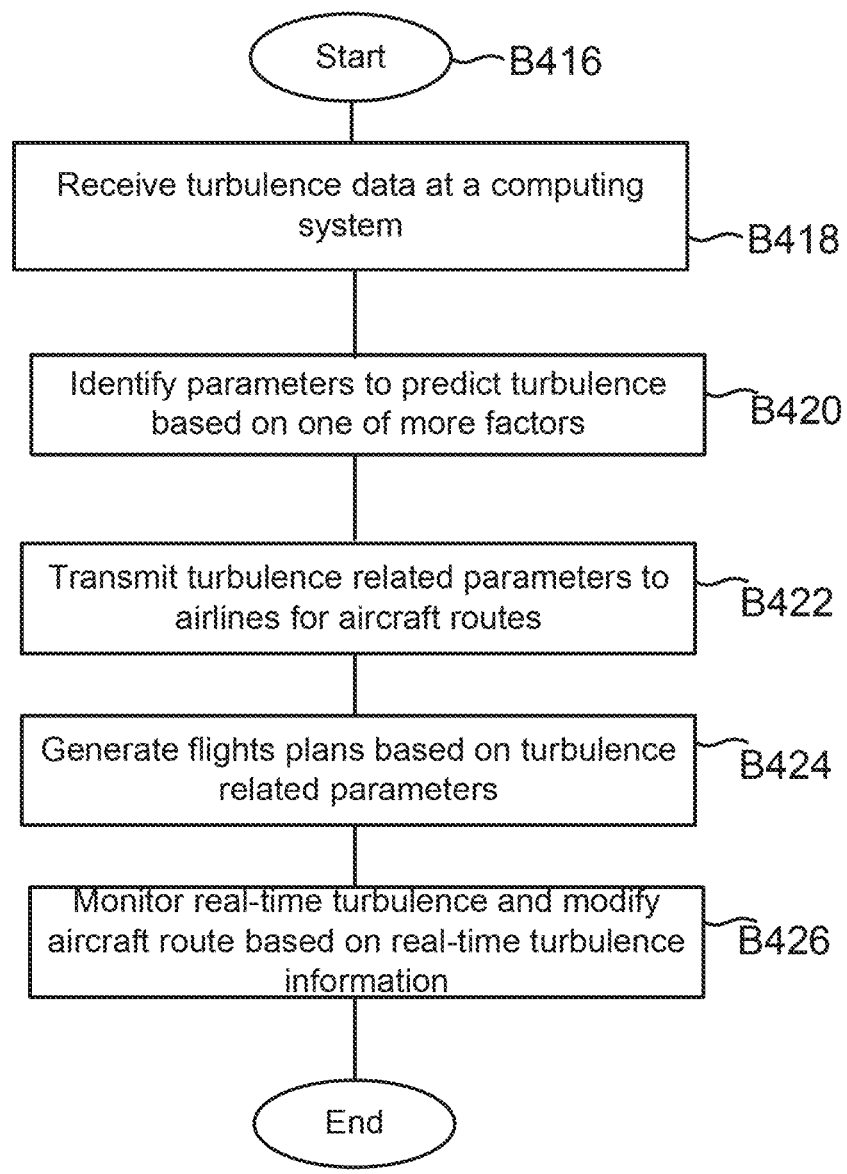
FIG. 4B shows a process flow for using turbulence related data for managing aircraft routes, according to one aspect of the present disclosure.

FIG. 4B shows process 414 according to one aspect of the present disclosure. The process begins in block B416 when turbulence signatures indicating turbulence for one or more aircraft have been collected using antenna system 110. The turbulence signature identifies an aircraft, sensor data, change in aircraft position, threshold value used to detect turbulence, geographical location, terrain data where the aircraft was located when turbulence was detected and/or other information. This data is received by one or more computing systems in block B418. In one aspect, the computing systems receiving the data are configured to operate in a cluster, for example, a Hadoop cluster.

In block B420, one or more parameters are identified to predict turbulence, for example, weather pattern, physical terrain or any other parameter. In particular, the data is aggregated together and processed using machine learning as described earlier. With a large data set of turbulence events, signature matching can be improved by combination.

In block B422, the identified parameters are provided to airlines. The airlines can use the parameters to generate flight plans in block B424. The real time turbulence data is then monitored in block B426. Aircraft routes can be modified based on real time data, as described above with respect to FIG. 4A.

In one aspect, methods and systems for detecting turbulence are provided. One method includes collecting data by a plurality of sensors of an antenna system of an IFE system of an aircraft, the plurality of sensors collecting aircraft rotation data, aircraft acceleration data, data indicating change in magnetic flux, and data indicating atmospheric pressure and temperature; detecting a change in position of the aircraft by a computing device of the IFE system based on the collected data; identifying turbulence by the computing device based on the detected change in position along with other data matching a signature indicative of turbulence; transmitting at least one data packet with a turbulence profile by the computing device to a ground based computing system, the turbulence profile including data from the plurality of sensors used for identifying turbulence; and using the turbulence profile by the ground-based computing system for modifying a route of another aircraft In another aspect, a method includes using an antenna system of an IFE system of an aircraft for collecting aircraft rotation data, aircraft acceleration data, data indicating change in magnetic flux, and data indicating atmospheric pressure and temperature; comparing data retrieved from the antenna system to a threshold value by a computing device of the aircraft to detect turbulence; transmitting a turbulence signature by the computing device to a ground based computing system, the turbulence signature including data used for identifying turbulence; determining a parameter by the ground based computing system for predicting turbulence, based on the turbulence signature; and generating a flight plan by the ground based computing system, based on predicted turbulence.

In yet another aspect, a non-transitory machine readable storage medium having stored thereon instructions for performing a method is provided. The machine executable code which when executed by at least one machine, causes the machine to: collect data by a plurality of sensors of an antenna system of an IFE system of an aircraft, the plurality of sensors collecting aircraft rotation data, aircraft acceleration data, data indicating change in magnetic flux, and data indicating atmospheric pressure and temperature; detect a change in position of the aircraft by a computing device of the IFE system based on the collected data; identify turbulence by the computing device based on the detected change in position matching a threshold signature indicative of turbulence; transmit at least one data packet with a turbulence profile by the computing device to a ground based computing system, the turbulence profile including data from the plurality of sensors used for identifying turbulence; and use the turbulence profile by the ground-based computing system for modifying a route of another aircraft.

Figure 5:
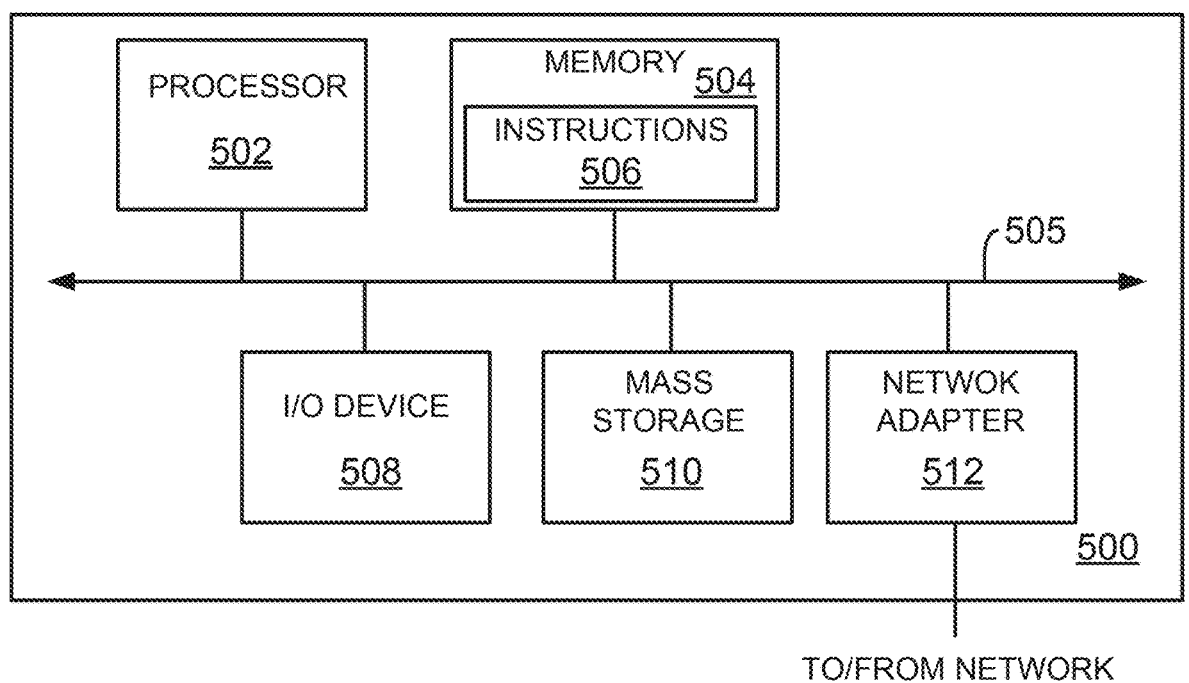
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent media server 112, computing system 106, WAP 130, onboard management system 344, seat device 326, any user device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to store data structure 327 and implement the process steps of FIGS. 4A-4B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for turbulence detection have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
storing a machine-learned, turbulence signature on an aircraft by an in-flight entertainment and communication (IFEC) system;
identifying from the turbulence signature one or more parameters for predicting turbulence for the aircraft;
collecting data by a plurality of sensors of an antenna system of the IFEC system, the antenna system oriented to establish a communication link with a satellite, and the collected data defining a plurality of data parameters including aircraft rotation data, aircraft acceleration data, data indicating change in magnetic flux, data indicating atmospheric pressure and temperature, and GPS (global positioning system) data;
transmitting the collected data from the antenna system to a computing device of the IFEC system;
detecting a change in position of the aircraft by the computing device based on the collected data;
identifying turbulence by the computing device based on the one or more identified parameters and the plurality of data parameters matching the turbulence signature;

in response to identifying the turbulence, transmitting at least one data packet with a turbulence profile of the aircraft by the computing device to a ground based computing system, the turbulence profile including the collected data, a threshold value associated with the plurality of data parameters and the one or more parameters identified by the turbulence signature; and using the turbulence profile by the ground-based computing system for modifying a route of another aircraft.

2. The method of claim 1, wherein the threshold value associated with the plurality of data parameters vary based on aircraft type and aircraft altitude.

3. The method of claim 1, wherein a closeness of matching the turbulence signature indicates a confidence level in the identifying turbulence for the aircraft.

4. The method of claim 1, wherein the turbulence profile identifies the aircraft, altitude and a geographical location where turbulence was detected, and the one or more identified parameters include a physical terrain for predicting turbulence.

5. The method of claim 1, wherein the one or more identified parameters include a weather pattern for predicting turbulence.

6. The method of claim 1, wherein the turbulence profile is provided to an airline for creating a flight plan.

7. The method of claim 1, wherein the IFEC system includes a seat device that identifies turbulence based on the collected data and the turbulence signature.

8. A non-transitory machine readable storage medium having stored thereon instructions for performing a method, comprising machine executable code which when executed by at least one machine, causes the machine to:

store a machine-learned, turbulence signature on an aircraft by an in-flight entertainment and communication (IFEC) system;

identify from the turbulence signature one or more parameters for predicting turbulence for the aircraft;

collect data by a plurality of sensors of an antenna system of the IFEC system, the antenna system oriented to establish a communication link with a satellite, and, the collected data defining a plurality of data parameters including aircraft rotation data, aircraft acceleration data, data indicating change in magnetic flux, data indicating atmospheric pressure and temperature, and GPS (global positioning system) data;

transmit the collected data from the antenna system to a computing device of the IFEC system;

detect a change in position of the aircraft by the computing device based on the collected data;

identify turbulence by the computing device based on the one or more identified parameters and the plurality of data parameters matching the turbulence signature;

transmit a data packet with a turbulence profile of the aircraft by the computing device to a ground based computing system, the turbulence profile including the collected data, a threshold value associated with the plurality of data parameters and the one or more parameters identified by the turbulence signature; and use the turbulence profile by the ground-based computing system for modifying a route of another aircraft.

9. The storage medium of claim 8, wherein the one or more identified parameters include a weather pattern for predicting turbulence.

10. A method, comprising:

using an antenna system of an in-flight entertainment and communication (IFEC) system of an aircraft for collecting a plurality of data parameters including aircraft rotation data, aircraft acceleration data, data indicating change in magnetic flux, data indicating atmospheric pressure and temperature, and GPS (global positioning system) data, the antenna system oriented to establish a communication link with a satellite;

comparing by a computing device of the aircraft, the plurality of data parameters retrieved from the antenna system to a machine learned, turbulence signature;

predicting turbulence by the computing device, based on one or more parameters identified by the turbulence signature, and the plurality of data parameters reaching a threshold value as determined from comparing the plurality of data parameters with the turbulence signature;

transmitting a turbulence profile for the aircraft by the computing device to a ground based computing system parameters for predicting turbulence, the turbulence profile signature including the one or more identified parameters, the plurality of data parameters, and the threshold value associated with each of the plurality of data;

and generating a flight plan by the ground based computing system, based on the predicted turbulence.

11. The method of claim 10, wherein the turbulence profile identifies the aircraft, altitude and a geographical location where turbulence was detected, and the one or more identified parameters include a physical terrain for predicting turbulence.

12. The method of claim 10, wherein the turbulence profile identifies the aircraft, altitude, a geographical location where turbulence was detected, and a weather pattern used for predicting turbulence.

13. The method of claim 10, wherein a gyroscope of the antenna system provides aircraft rotation data.

14. The method of claim 10, wherein an accelerometer of the antenna system provides aircraft acceleration data.

15. The method of claim 10, wherein a magnetometer of the antenna system provides data indicating a change in magnetic flux.

16. The method of claim 10, wherein at least one of a pressure sensor and a temperature sensor of the antenna system provides the data indicating atmospheric pressure.

17. The storage medium of claim 8, wherein a closeness of matching the turbulence signature indicates a confidence level in the identifying turbulence for the aircraft.

18. The storage medium of claim 8, wherein the threshold value associated with the plurality of data parameters vary based on aircraft type and aircraft altitude.

19. The storage medium of claim 8, wherein the turbulence profile identifies the aircraft, altitude and a geographical location where turbulence was detected, and the one or more identified parameters include a physical terrain for predicting turbulence.

20. The storage medium of claim 8, wherein the turbulence profile is provided to an airline for creating a flight plan.

* * * * *